(12) United States Patent
Inoue et al.

(10) Patent No.: US 8,356,940 B2
(45) Date of Patent: Jan. 22, 2013

(54) WHEEL BEARING APPARATUS INCORPORATED WITH A ROTATIONAL SPEED DETECTING APPARATUS

(75) Inventors: Yasuyuki Inoue, Iwata (JP); Kohei Yoshino, Iwata (JP); Yoshihiro Itoh, Osaka (JP)

(73) Assignees: NTN Corporation, Osaka-shi (JP); Nakanishi Metal Works Co., Ltd., Osaka-shi (JP)

( * ) Notice: Subject to any disclaimer, the term of this patent is extended or adjusted under 35 U.S.C. 154(b) by 0 days.

(21) Appl. No.: 13/409,704

(22) Filed: Mar. 1, 2012

(65) Prior Publication Data

US 2012/0230621 A1 Sep. 13, 2012

Related U.S. Application Data

(63) Continuation of application No. PCT/JP2010/064924, filed on Sep. 1, 2010.

(30) Foreign Application Priority Data

Sep. 2, 2009 (JP) ................................. 2009-202196

(51) Int. Cl.
*F16C 41/00* (2006.01)
*F16C 33/76* (2006.01)

(52) U.S. Cl. ........................................ 384/448; 384/489

(58) Field of Classification Search .................. 384/448, 384/489; 301/105.1; 264/328.1, 328.12; 324/160–180

See application file for complete search history.

(56) References Cited

U.S. PATENT DOCUMENTS

| | | | | |
|---|---|---|---|---|
| 6,218,827 B1 * | 4/2001 | Ohmi et al. | | 324/174 |
| 6,254,276 B1 * | 7/2001 | Ouchi et al. | | 384/448 |
| 6,830,379 B2 * | 12/2004 | Morita et al. | | 384/448 |
| 2006/0002644 A1 * | 1/2006 | Mitsue et al. | | 384/448 |
| 2006/0159377 A1 * | 7/2006 | Shigeoka et al. | | 384/448 |

FOREIGN PATENT DOCUMENTS

| | | |
|---|---|---|
| JP | 2005-009527 | 1/2005 |
| JP | 2007-120560 | 5/2007 |
| JP | 2008-008375 | 1/2008 |
| JP | 2008-106795 | 5/2008 |

* cited by examiner

*Primary Examiner* — Phillip A Johnson
(74) *Attorney, Agent, or Firm* — Harness, Dickey & Pierce, P.L.C.

(57) ABSTRACT

A wheel bearing apparatus incorporating a rotational speed detecting apparatus has an outer member, an inner member and double row rolling elements contained between inner and outer raceway surfaces of the inner and outer members. A pulser ring is fit onto the outer circumference of the inner ring. A cylindrical sensor cap is fit into the inner circumference of the inner-side end of the outer member. A mounting portion axially projects from a radially outer portion of the sensor cap. An inserting bore is formed in the mounting portion so that it axially extends at a position corresponding to the pulser ring. A sensor unit is mounted in the inserting bore. A rotational speed sensor is embedded in the sensor unit to oppose the pulser ring, via a predetermined axial air gap. The position of a gate of a mold is set on the mounting portion of the sensor cap.

10 Claims, 10 Drawing Sheets

(a)

(b)

(a)

(b)

WHEEL BEARING APPARATUS INCORPORATED WITH A ROTATIONAL SPEED DETECTING APPARATUS

CROSS-REFERENCE TO RELATED APPLICATIONS

This application is a continuation of International Application No. PCT/JP2010/064924, filed Sep. 1, 2010, which claims priority to Japanese Application No. 2009-202196, filed Sep. 2, 2009. The disclosures of the above applications are incorporating herein by reference.

FIELD

The present disclosure generally relates to a wheel bearing apparatus that rotatably supports a wheel of a vehicle, such as an automobile, with respect to a suspension apparatus. More particularly, the disclosure relates to a wheel bearing apparatus incorporating a rotational speed detecting apparatus to detect wheel speed of a vehicle and to improve the sealability of the wheel bearing.

BACKGROUND

A wheel bearing apparatus is generally known that can support a wheel of a vehicle with respect to a suspension apparatus and incorporates a rotational speed detecting apparatus to detect rotation speed of a wheel of the vehicle to control the anti-lock braking system (ABS). Such a bearing apparatus generally includes a rotational speed detecting apparatus with a magnetic encoder having magnetic poles alternately arranged along its circumference. A sealing apparatus is integrated and arranged between the inner and outer members that rotate relative to each other via rolling elements (balls). A rotational speed detecting sensor is present to detect the variation in the magnetic poles of the magnetic encoder according to the rotation of the wheel.

The rotational speed sensor is usually mounted on a knuckle, forming part of the suspension apparatus, after the wheel bearing apparatus is mounted on the knuckle. Recently proposed is a wheel bearing apparatus incorporating a rotational speed detecting apparatus with a rotational speed detecting sensor that is incorporated into the wheel bearing. This apparatus is to reduce the size of the wheel bearing apparatus as well as to eliminate troublesome in air gap adjustment between the rotational speed sensor and the magnetic encoder.

An example of a known wheel bearing apparatus incorporating a rotational speed detecting apparatus is shown in FIG. 8. The wheel bearing apparatus incorporating a rotational speed detecting apparatus comprises an outer member 51 and an inner member 52. The outer member 51 forms a stationary member adapted to be secured to a knuckle (not shown). The inner member 52 is inserted into the outer member 51 via double row balls 53, 53. The inner member 52 includes a wheel hub 55 and an inner ring 56 fit onto the wheel hub 55.

The outer member 51 outer circumference has an integrally formed body mounting flange 51b. The outer member 51 inner circumference has double row inner raceway surfaces 51a, 51a. On the other hand, the inner member 52, i.e. the wheel hub 55 and the inner ring 56, have, on their outer circumferences, double row inner raceway surfaces 55a, 56a, respectively, opposing the outer raceway surfaces 51a, 51a of the outer member 51. The inner ring 56 is press-fit onto a cylindrical portion 55b that axially extends from the inner raceway surface 55a of the wheel hub 55. Double row balls 53, 53 are contained between the outer and inner raceway surfaces and are held by cages 57, 57.

The wheel hub 55 is integrally formed with a wheel mount flange 54 for mounting a wheel (not shown) on its outer circumference. The end of the cylindrical portion 55b is plastically deformed radially outward to form a caulked portion 58 to axially secure the inner ring 56. A seal 59 and a sensor cap 63 are mounted on the ends of the outer member 51 to prevent leakage of lubricating grease sealed within the bearing and to prevent entry of rain water or dust from the outside into the bearing.

A magnetic encoder 60 is press-fit onto the outer circumference of the inner ring 56. The magnetic encoder includes an annular supporting member 62 formed by a magnetic metal sheet. The member 62 has a substantially L-shaped cross-section. An encoder body 61 is adhered to one side of the annular supporting member 62. The encoder body 61 is formed of a rubber permanent magnet mingled with ferritic powder and has N and S poles alternately arranged along its circumference.

The sensor cap 63 is fit into the inner circumference of the inner-side end of the outer member 51 to close the opened portion of the outer member 51. The sensor cap 63 includes a cylindrical cap body 64, with a bottom formed by plastic injection molding, and an annular metallic member 65 joined to the cap body 64. The annular metallic member 65 is press-formed of a steel sheet to have a substantially L-shaped cross-section. The annular metallic member 65 is integrated with the cap body 64 during injection molding of the cap body 64.

An axially projecting portion 66 is formed on the radially outer portion of the cap body 64. The portion 66 includes an inserting bore 67 at a position corresponding to the magnetic encoder 60. A sleeve 68 is fit into the inserting bore 67. A sensor 69 is inserted into the sleeve 68 via an O ring 70 as shown in FIG. 9. The sensor 69 includes a magnetic detecting element 71, such as a Hall element, a magnetic resistance element (MR element) etc. changing characteristics (magnetic polarities) in accordance with the flowing direction of magnetic flux, and an IC etc., incorporating with a waveform shaping circuit for shaping the output waveform of the magnetic detecting element 71. The sensor 69 forms part of the ABS of an automobile for controlling the rotational speed of wheels while detecting it.

A mounting piece 72 is mounted on the sensor 69 and projects from it. The mounting piece 72 has a bolt inserting aperture 73 that receives a sleeve 74. Thus, the sensor 69 can be mounted on cap body 64 by screwing a sensor securing bolt 75 inserted into the sleeve 74 into an insert nut 76.

The cap body 64 and the sensor 69 are formed of synthetic resin material (plastic) of low water absorption of the groups, such as PA (polyamide) 612, PPS (polyphenylene sulfide) etc., in order to keep the sealability while preventing the dimensional change and the generation of cracks due to water absorption of the sensor mounting members (see Patent Document-Japanese Laid-open Patent Publication No. 2007-120560).

In such a wheel bearing apparatus incorporating a rotational speed detecting apparatus of the prior art, the cap body 64 is formed by injection molding of synthetic resin fed into a mold through a gate 77 as shown in FIG. 10. An injecting port to the gate 77 has a conical cross-section as shown by a two dotted line in FIG. 10(a) and is formed integrally with a mold body. Accordingly, the gate 77 should be arranged at a position apart from the projected portion 66 in order to prevent the injecting port from being interfered with by the projected portion 66 of the cap body 64.

However, the synthetic resin tends to circumferentially flow along the fitting portion, as shown by dotted line arrows in FIG. 10(b), if the gate 77 is positioned away from the center of the cap body 64. Thus, although the synthetic resin smoothly flows circumferentially in regions A, it would flow slowly and stay in a region B. Such a difference in flowing speeds of synthetic resin causes differences in time duration of solidification of the synthetic resin.

In other words, the synthetic resin tends not to be easily shrunk in the regions A where the synthetic resin can flow smoothly. On the contrary, the synthetic resin tends to be easily shrunk in the region B where the synthetic resin cannot flow smoothly. In such a case, shrink marks etc. would be caused in the region B. Thus, the cap body 64 would be deformed to an oval-like configuration of less roundness. Accordingly, it is believed that the sealability of the fitting portion of the cap body 64 would be detracted. Thus, foreign matter, such as rain water or dust, would enter into the bearing. The sensor cap 63 would move or slip relative to the outer member 51 by shocks or vibrations caused during running of the vehicle. Thus, the initially set air gap between the magnetic encoder 60 and the magnetic detecting element 71 would be detracted.

SUMMARY

It is, therefore, an object of the present disclosure to provide a wheel bearing apparatus incorporating a rotational speed detecting apparatus that can solve problems of prior art described above. Thus, the present apparatus improves the accuracy of the sensor cap to assure the sealability between the outer member and the sensor cap.

To achieve the objects, a wheel bearing apparatus incorporating a rotational speed detecting apparatus comprises an outer member and inner member. The outer member is integrally formed, on its inner circumference, with double row outer raceway surfaces. The inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The wheel hub and the inner ring are formed on their outer circumferences with double row inner raceway surfaces that oppose the double row outer raceway surfaces. Double row rolling elements are contained between the inner and outer raceway surfaces of the inner and outer members. A pulser ring is adapted to fit onto the outer circumference of the inner ring and secure to it. The pulser ring has a magnetic characteristics alternately and equidistantly varying along its circumferential direction. A cylindrical sensor cap has a bottom formed by plastic injection molding. The sensor cap is adapted to fit into the inner circumference of the inner-side end of the outer member and secures to it. A mounting portion axially projects from a radially outer portion of the sensor cap. An inserting bore is formed in the mounting portion. The bore axially extends at a position corresponding to the pulser ring. A sensor unit is mounted in the inserting bore. A rotational speed sensor is embedded in the sensor unit and opposes the pulser ring via a predetermined axial air gap. The position of a gate of a mold is set on the mounting portion of the sensor cap.

The wheel bearing apparatus incorporating a rotational speed detecting apparatus includes a pulser ring adapted to fit onto the outer circumference of the inner ring and secured to it. The pulser ring has magnetic characteristics alternately and equidistantly varying along its circumferential direction. A cylindrical sensor cap has a bottom formed by plastic injection molding. The sensor cap is adapted to be fit into the inner circumference of the inner-side end of the outer member and secures to it. A mounting portion axially projects from a radially outer portion of the sensor cap. An inserting bore is formed in the mounting portion so that it axially extends at a position corresponding to the pulser ring. A sensor unit is mounted in the inserting bore. A rotational speed sensor is embedded in the sensor unit opposing the pulser ring, via a predetermined axial air gap. The position of a gate of a mold is set on the mounting portion of the sensor cap. Thus, it is possible to prevent a pouring port formed integrally with a mold body from being interfered with by the mounting portion of the sensor cap. Also, it assures a smooth flow of melted synthetic resin radially outward through and toward the mounting portion. Thus, this prevents the generation of a large time lag in radial flows of the synthetic resin. Accordingly, it is possible to provide a wheel bearing apparatus incorporating a rotational speed detecting apparatus that can prevent the generation of shrink marks etc. and keep a desired roundness of the sensor cap. Thus, this improves the accuracy of the sensor cap and the sealability between the outer member and sensor cap.

The position of the gate is set substantially at the center of the sensor cap. This enables the melted synthetic resin to smoothly flow radially outward through the mounting portion. Thus, this causes substantially uniform resin flows. Accordingly, it is possible to prevent the generation of shrink marks etc. and to keep a desired roundness of the sensor cap. Thus, this improves the accuracy of the sensor cap.

An extended portion is formed continuously from the mounting portion of the sensor cap. The position of the gate is set on the extended portion. This makes it possible to set the position of the gate so that the melted synthetic resin can smoothly flow radially outward. Thus, this causes substantially uniform resin flows without any influence of the configuration and size of the mounting portion.

The top end face of the extended portion is formed so that it is positioned slightly lower than that of the mounting portion. The top end face of the extended portion is formed so that it is positioned slightly higher than that of the mounting portion. The top end face of the extended portion is formed so that it is positioned at substantially the same height as that of the mounting portion. The width of the extended portion is formed so that it is smaller than that of the mounting portion. This reduces materials, cost and weight of the cap body.

The sensor unit comprises a sensor holder integrally formed by an inserting portion where the rotational speed sensor is embedded. A mounting flange is mounted on the mounting portion of the sensor cap. A nut is embedded in the mounting portion by insert molding. The sensor holder is detachably secured to the mounting portion by a securing bolt screwed into the nut. This makes it possible to surely secure the sensor unit for a long term without being moved or displaced relative to the sensor cap.

The sensor cap comprises a cylindrical cap body with a bottom formed by plastic injection molding. A metal core is integrally molded into an opening of the cap body. The metal core is exposed to the outer circumference of the cap body. The metal core is press-fit into the inner circumference of the end of the outer member. This makes it possible to increase the strength and rigidity of the sensor cap and improve the sealability of the fitting portion due to the metal-to-metal fit.

The metal core is formed by press working of a non-magnetic steel sheet. This makes it possible to achieve a speed detection with high accuracy without causing any inferior effect on the detecting performance of the rotational speed sensor.

The wheel bearing apparatus incorporating a rotational speed detecting apparatus of the present disclosure has an outer member. The outer member is integrally formed, on its inner circumference, with double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The wheel hub and the inner ring are formed on their outer circumferences, with double row inner raceway surfaces that oppose the double row outer raceway surfaces. Double row rolling elements are contained between the inner and outer raceway surfaces of the inner and outer members. A pulser ring is adapted to be fit onto the outer circumference of the inner ring and secures to it. The pulser ring has magnetic characteristics (magnetic polarities) alternately and equidistantly varying along its circumferential direction. A cylindrical sensor cap has a bottom formed by plastic injection molding. The sensor cap is adapted to be fit into the inner circumference of the inner-side end of the outer member and secures to it. A mounting portion axially projects from a radially outer portion of the sensor cap. An inserting bore is formed in the mounting portion so that it axially extends at a position corresponding to the pulser ring. A sensor unit is mounted in the inserting bore. A rotational speed sensor is embedded in the sensor unit and it opposes the pulser ring, via a predetermined axial air gap. The position of a gate of a mold is set on the mounting portion of the sensor cap. Thus, it is possible to prevent an injecting port formed integrally with a mold body from interfering with the mounting portion of the sensor cap. Also, it assures a smooth flow of melted synthetic resin radially outward through and toward the mounting portion. Thus, this prevents the generation of a large time lag in the radial flows of the synthetic resin. Accordingly, it is possible to provide a wheel bearing apparatus incorporating a rotational speed detecting apparatus that can prevent any generation of shrink marks etc. and keep a desired roundness of the sensor cap. Thus, this improves the accuracy of the sensor cap and the sealability between the outer member and the sensor cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus incorporating a rotational speed detecting apparatus comprises an outer member having, on its outer circumference, an integrally formed body mounting flange. The outer member inner circumference has double row inner raceway surfaces. An inner member includes a wheel hub and an inner ring. The wheel hub is integrally formed, on its one end, with a wheel mounting flange. The wheel hub has an inner raceway surface that opposes one of the double row outer raceway surfaces. A cylindrical portion axially extends from the wheel mounting flange. The inner ring is press fit onto the cylindrical portion of the wheel hub. The inner ring has the other inner raceway surface opposing the other of the double row outer raceway surfaces. Double row rolling elements are contained between the inner and outer raceway surfaces of the inner and outer members. A pulser ring is adapted to be fit onto the outer circumference of the inner ring and secures to it. The pulser ring has magnetic characteristics (magnetic polarities) alternately and equidistantly varying along its circumferential direction. A sensor cap is adapted to be fit into the inner circumference of the inner-side end of the outer member and secures to it. The sensor cap has a cylindrical cap body with a bottom formed by plastic injection molding. A metal core is integrally molded with the opening of the cap body. A mounting portion axially projects from a radially outer portion of the sensor cap. An inserting bore is formed in the mounting portion so that it axially extends at a position corresponding to the pulser ring. A sensor unit is mounted in the inserting bore. A rotational speed sensor is embedded in the sensor unit and opposes the pulser ring, via a predetermined axial air gap. The sensor unit comprises a sensor holder integrally formed by an inserting portion where the rotational speed sensor is embedded. A mounting flange is mounted on the mounting portion of the sensor cap. A nut is embedded in the mounting portion by insert molding. The sensor unit is detachably secured to the mounting portion by a securing bolt screwed into the nut. The position of the gate is set substantially at the center of the sensor cap.

A preferred embodiment of the present disclosure will be described with reference to the accompanied drawings.

Figure 1:
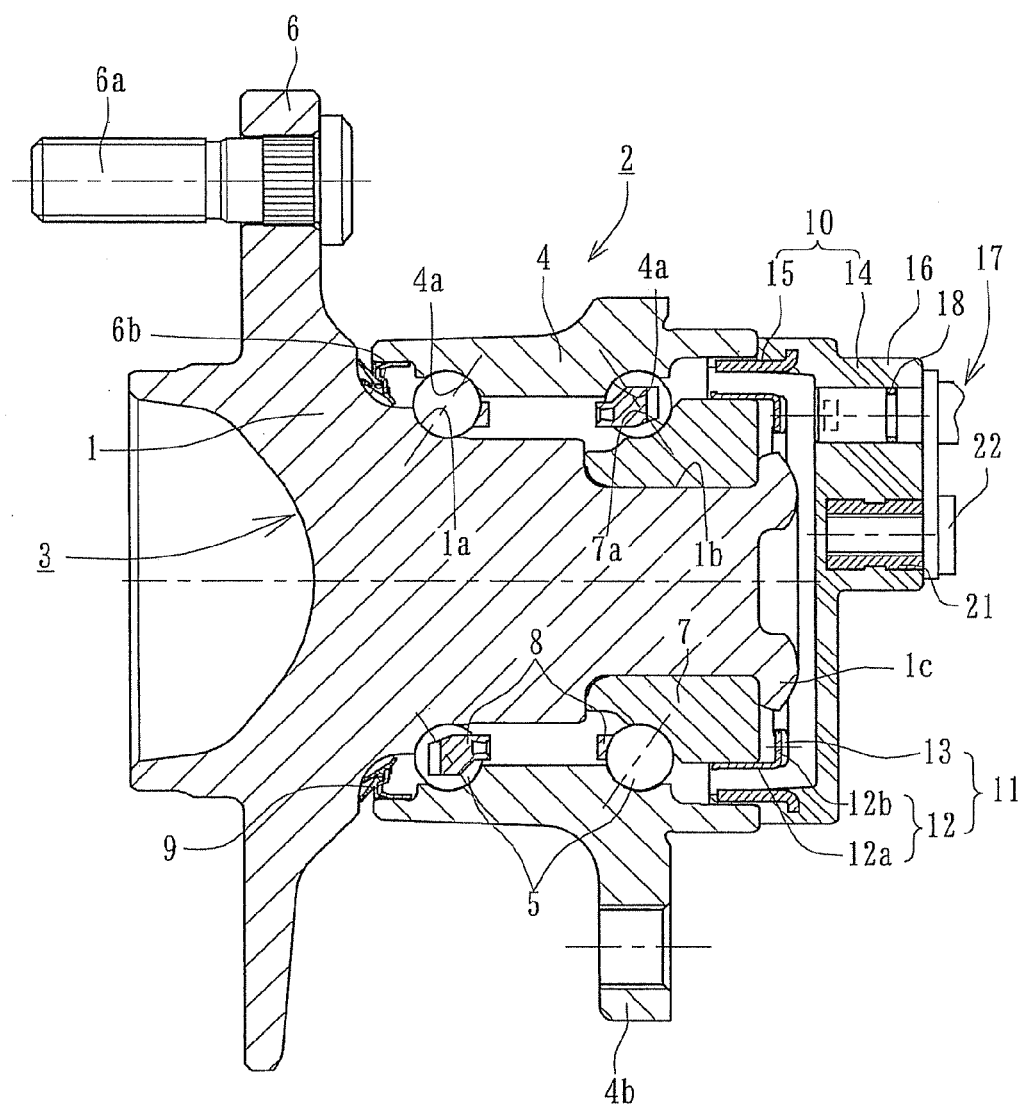
FIG. 1 is a longitudinal-section view of a first embodiment of a wheel bearing apparatus incorporating a rotational speed detecting apparatus.
Figure 2:
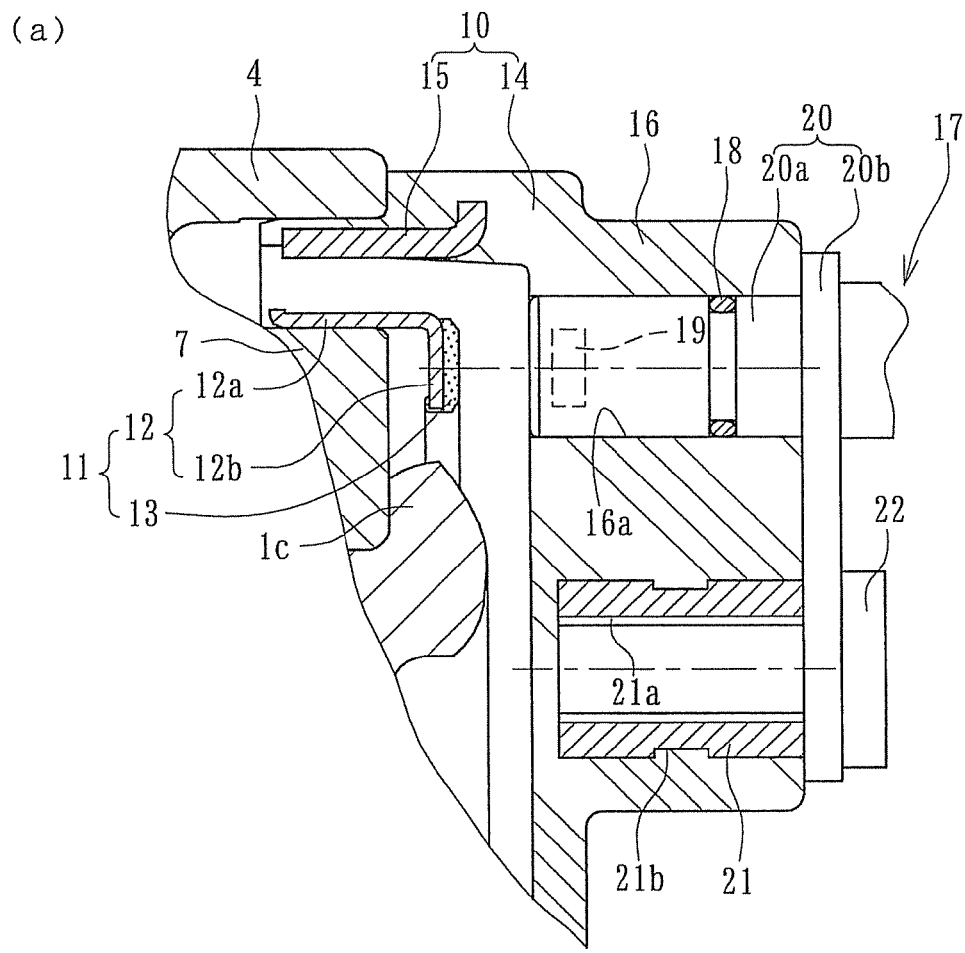
FIG. 2(a) is a partially enlarged view of FIG. 1.
FIG. 2(b) is a partially enlarged view of a modification of FIG. 2(a).
Figure 2:
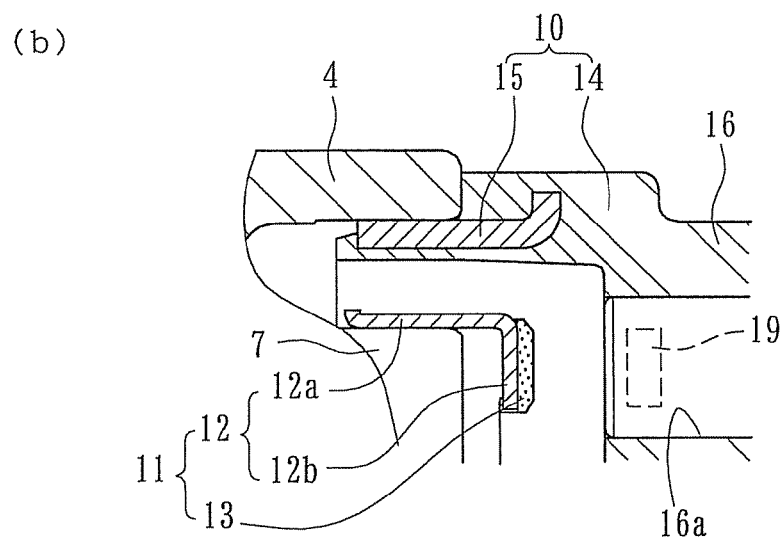
Figure 3:
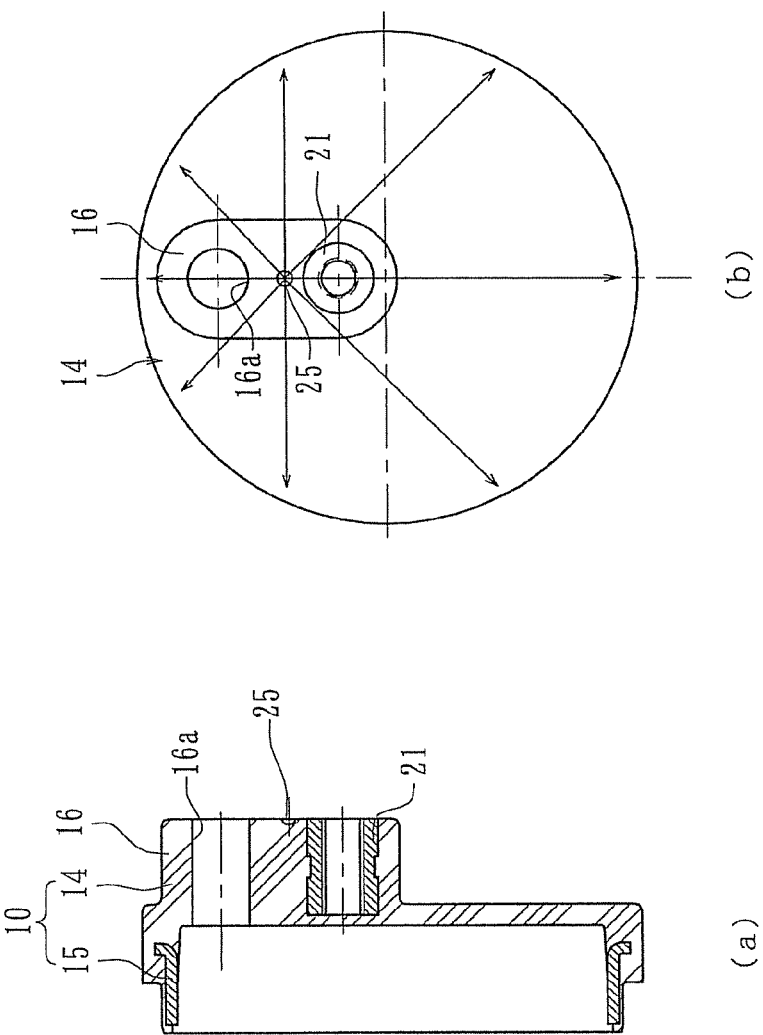
FIG. 3(a) is a longitudinal-section view of a sensor cap.
FIG. 3(b) is a side elevation view of FIG. 3(a).

FIG. 1 is a longitudinal-section view of a first embodiment of a wheel bearing apparatus incorporating a rotational speed detecting apparatus. FIG. 2(a) is a partially enlarged view of FIG. 1. FIG. 2(b) is a partially enlarged view of a modification of FIG. 2(a). FIG. 3(a) is a longitudinal-section view of a sensor cap alone. FIG. 3(b) is a side elevation view of FIG. 3(a). FIGS. 4 through 7 illustrate modifications of FIG. 3. In the description below, an outer-side of a bearing apparatus, when it is mounted on a vehicle, is referred to as the "outer-side" (the left side in the drawing). The inner-side of the bearing apparatus, when it is mounted on a vehicle, is referred to as the "inner side" (the right side in the drawing).

The wheel bearing apparatus incorporating a rotational speed detecting apparatus is a so-called "third generation" type. It is formed as a unit with a wheel hub 1 and a double row rolling bearing 2. The double row rolling bearing 2 has an inner member 3, an outer member 4, and double row rolling elements (balls) 5, 5 contained between the inner and outer members 3 and 4. The inner member 3 includes the wheel hub 1 and an inner ring 7 press-fit onto the wheel hub 1.

The wheel hub 1 is integrally formed, on its outer-side end, with a wheel mount flange 6 to mount a wheel (not shown). Hub bolts 6a are secured on the wheel mounting flange 6 at circumferentially equidistant positions. In addition, the wheel hub 1 is formed, on its outer circumference, with one (outer-side) inner raceway surface 1a. A cylindrical portion 1b axially extends from the inner raceway surface 1a. The inner ring 7 is press-fit, via a predetermined interference, on the cylindrical portion 1b. The inner ring 7 is axially secured on the wheel hub 1 under a predetermined pre-pressured condition by a caulked portion 1c. The caulked portion 1c is formed by plastically deforming the end of the cylindrical portion 1b radially outward. An inner-side inner raceway surface 7a is formed on the outer circumference of the inner ring 7.

The outer member 4 is integrally formed, on its outer circumference, with a body mount flange 4b. The body mount flange 4b is adapted to be mounted on a knuckle (not shown). The outer member 4 inner circumference has double row outer raceway surfaces 4a, 4a that oppose the double row inner raceway surfaces 1a, 7a of the inner member 3. The double row rolling bearing 2 includes the double row rolling elements 5, 5 contained between the inner and outer raceway surfaces 1a 7a; 4a, 4a. Cages 8 rollably hold the rolling elements 5, 5 equidistantly along the circumference.

A seal 9 is mounted on one end and a sensor cap is mounted on the other end of the outer member 4 to seal annular openings formed between the outer member 4 and the inner member 3. The seal 9 and sensor cap 10 prevent leakage of lubricating grease sealed within the bearing and the entry of rain water or dust from the outside into the bearing.

The wheel hub 1 is made of medium-high carbon steel such as S53C including carbon of 0.40~0.80% by weight. It is hardened by high frequency induction hardening to have a surface hardness of 58~64 HRC over a region including the inner raceway surface 1a from a base 6b of the wheel mounting flange 6, forming a seal land of the seal 9, to the cylindrical portion 1b. The caulked portion 1c is not hardened and kept as is with a hardness below 30 HRC after forging.

Similarly to the wheel hub 1, the outer member 4 is made of medium-high carbon steel such as S53C including carbon of 0.40~0.80% by weight. At least the double row outer raceway surfaces 4a, 4a are hardened by high frequency induction quenching to have a surface hardness of about 58~64 HRC. The inner ring 7 and the rolling elements 5 are formed of high carbon chrome steel such as SUJ2. They are dip hardened to their cores to have a hardness of about 58~64 HRC. Although it is shown that the double row angular contact ball bearing uses balls as the rolling elements 5, 5, the present disclosure is not limited to such a bearing. Thus, it may be applied to a double row tapered roller bearing using tapered rollers as the rolling elements. In addition, although it is shown as a bearing of the third generation type, the present disclosure can be applied to second generation type bearings where a pair of inner rings is press-fit onto the wheel hub.

A pulser ring 11 is press-fit onto the outer circumference of the inner ring 7. The pulser ring 11 includes an annular supporting member 12 and a magnetic encoder 13. The encoder 13 is adhered to one side of the annular supporting member 12 by vulcanizing adhesion. The magnetic encoder 13 is formed of an elastomer, such as rubber, with mingled ferritic magnetic powder so that N and S poles are alternately arranged along its circumference. This forms a rotary encoder to detect the rotational speed of a wheel.

The annular supporting member 12 is formed from a ferromagnetic steel plate such as ferritic stainless steel sheet (JIS SUS 430 etc.) or preserved cold rolled sheet (JIS SPCC etc.) by pressing it into a substantially L-shaped cross-section. It has a cylindrical portion 12a fit onto the inner ring 7. A standing plate portion 12b extends radially inward from the cylindrical portion 12a. The magnetic encoder 13 is adhered to the inner-side surface of the standing plate portion 12b.

A sensor cap 10 is adapted to be fit into the inner circumference of the inner-side end of the outer member 4 and secured to it. The sensor cap 10 closes an opening of the outer member 4. The sensor cap 10 includes a cylindrical cap body 14 with a bottom formed by plastic injection molding. A metal core 15 is integrally molded into an opening of the cap body 14. The metal core 15 is formed as an annular member with a substantially L shaped cross-section. It is formed by press-forming a stainless steel sheet with corrosion resistance. In particularly, it is preferable that the metal core 15 is formed of non-magnetic steel sheet such as austenitic stainless steel sheet (JIS SUS 304 etc.). Thus, it does not cause any inferior effect on the detecting performance of the rotational speed sensor, described later. Fitting of the outer circumference of the cap body, formed of elastic plastic, into the opening of the outer member 4 enables improvement of the sealability between the two. As shown in FIG. 2(b), if the metal core 15 is exposed to the outer circumference of the cap body 14, and press-fit into the inner circumference of the end of the outer member 4, it is possible to increase the strength and rigidity of the sensor cap 10. This further improves the sealability of the fitting portion due to metal-to-metal fit.

As shown in the enlarged view of FIG. 2(a), a mounting portion 16 axially projects from a radially outer portion of the cap body 14 of the sensor cap 10. An inserting bore 16a is formed in the mounting portion 16 so that it axially extends at a position corresponding to the magnetic encoder 13 of the pulser ring 11. A sensor unit 17 is inserted into the inserting bore 16a via an O-ring 18.

The sensor unit 17 includes a rotational speed sensor 19 with a magnetic detecting element, such as a Hall element, a magnetic resistance element (MR element) etc. to change characteristics in accordance with the flowing direction of the magnetic flux. Also, an IC is incorporated with a waveform shaping circuit to shape the output waveform of the magnetic detecting element. This forms the ABS of an automobile to detect the rotational speed of a wheel and to control it.

The rotational speed sensor 19 is embedded in a sensor holder 20 formed of synthetic resin. The sensor holder 20 is integrally formed with an inserting portion 20a and a mounting flange 20b. In addition, a nut 21, formed with a female thread 21a on its inner circumference, is embedded by insert molding into the mounting portion 16 of the cap body 14. The sensor unit 17 is secured to the mounting portion 16 by fastening a securing bolt 22 through the mounting flange 20b. An annular groove 21b, formed on the outer circumference of the nut 21, can prevent an axial movement of the nut 21.

According to the present disclosure, the position of a gate 25 is set at a position between the inserting bore 16a of the mounting portion 16 of the cap body 14 and the nut 21, as shown in FIG. 3. Thus, it is possible to prevent the pouring port integrally formed with the mold body from being interfered with by the mounting portion 16 of the cap body 14. Also, it assures radial smooth flow of the melted synthetic resin through the mounting portion 16 as shown by arrows in FIG. 3(*b*). Thus, this prevents the generation of a large time lag in radial flowing velocities. Accordingly, it is possible to provide a wheel bearing apparatus incorporating a rotational speed detecting apparatus that prevents the generation of shrink marks etc. and keep a desired roundness of the sensor cap 10. Thus, this improves the accuracy of the sensor cap 10 and the sealability between the outer member and sensor cap.

Figure 4:
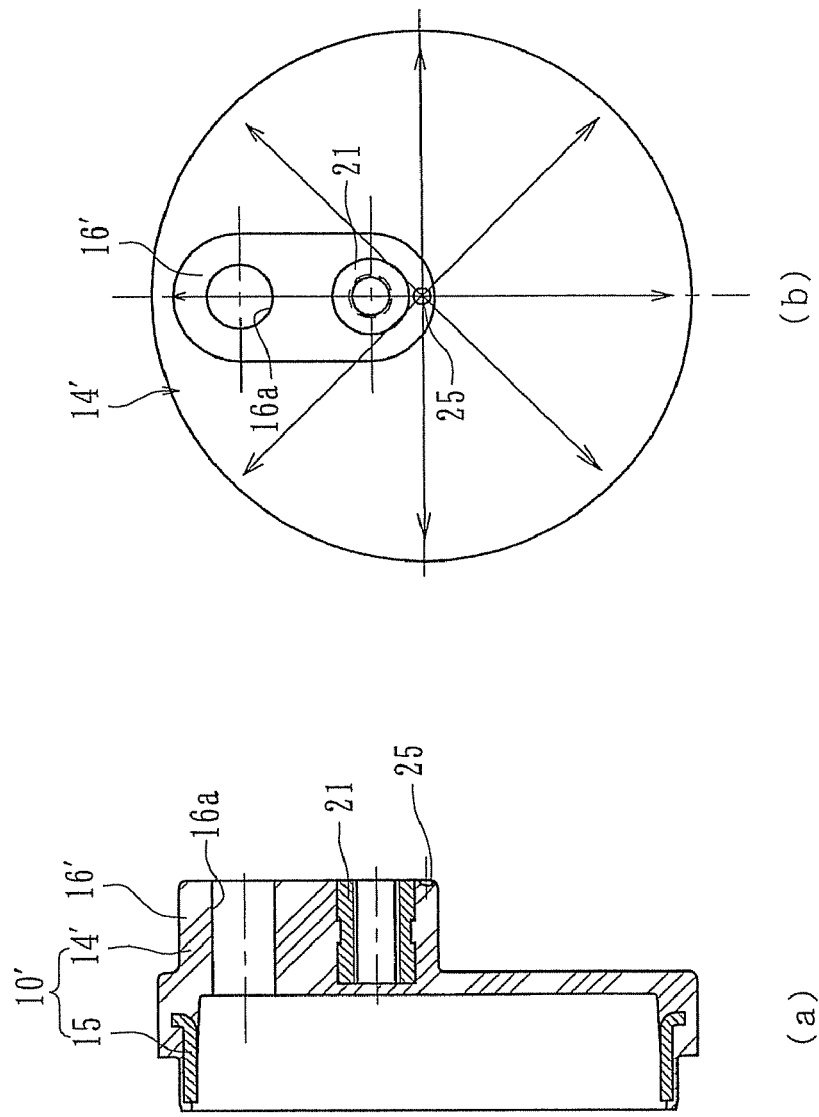
FIG. 4(a) is a longitudinal-section view of a modification of a sensor cap of FIG. 3.
FIG. 4(b) is a side elevation view of FIG. 4(a).

A modification of FIG. 3 is shown in FIG. 4. It basically differs from the previous embodiment only in the position of gate. Thus, the same reference numerals are used to designate the same or similar parts.

In this modification, the gate 25 is positioned substantially at the center of the cap body 14' and near the nut 21 of the mounting portion 16' of the cap body 14'. This makes it possible to prevent the pouring port integrally formed with the mold body from being interfered with by the mounting portion 16' of the cap body 14'. Also, it assures radial smooth flow of the melted synthetic resin through the mounting portion 16' and a substantially uniform flow velocity, as shown by arrows in FIG. 4(*b*). Accordingly, it is possible to prevent the generation of shrink marks etc. and to keep a desired roundness of the sensor cap 10'. Thus, this improves the accuracy of the sensor cap 10'.

Figure 5:
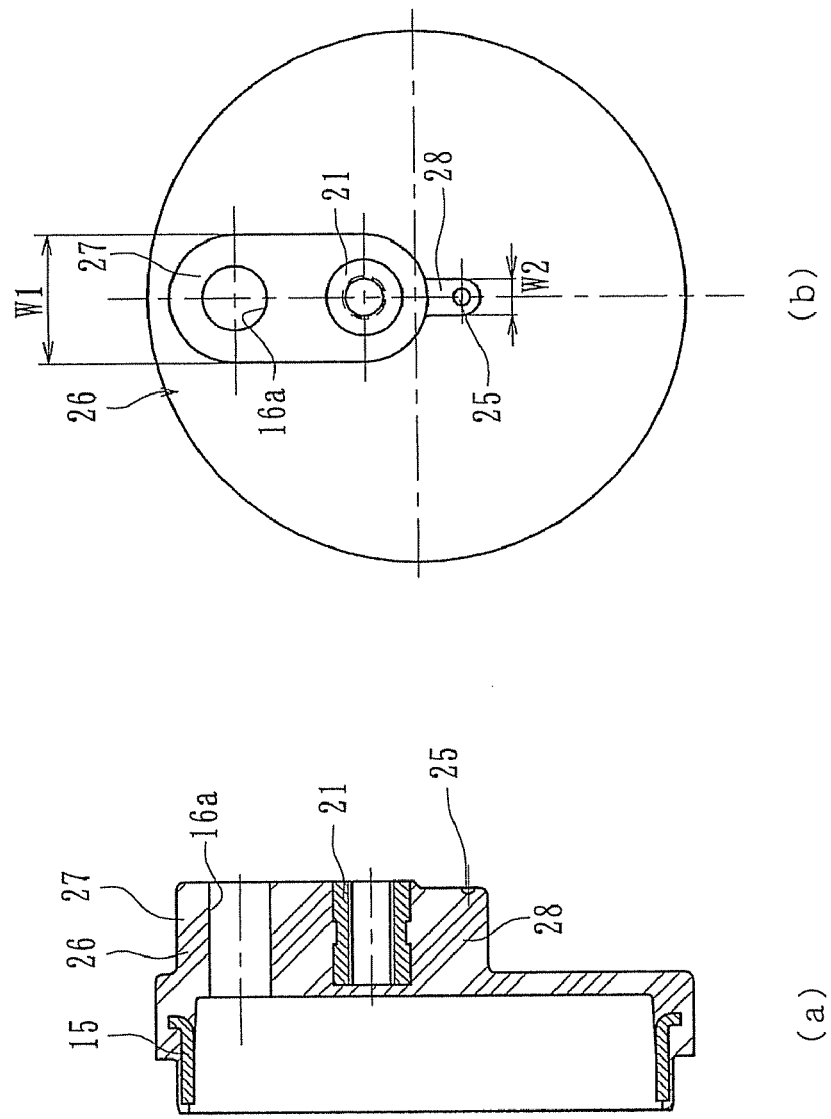
FIG. 5(a) is a longitudinal-section view of another modification of a sensor cap of FIG. 3.
FIG. 5(b) is a side elevation view of FIG. 5(a).

Another modification of FIG. 3 is shown in FIG. 5. It basically differs from the previous embodiments only in the configuration of the mounting portion. Thus, the same reference numerals are used for to designate the same or similar parts.

An axially projected mounting portion 27 is integrally formed with the cap body 26 at a radially outward portion. An extended portion 28 is formed continuously from the mounting portion 27. The top end face of the extended portion 28 is formed slightly lower than the top end face of the mounting portion 27. The gate 25 is set on the extended portion 28. Accordingly, this makes it possible to set the position of the gate 25 so that the pouring port integrally formed with the mold body is not interfered with by the mounting portion 27 of the cap body 26. Thus, radial smooth flow and substantially uniform flow velocity of the melted synthetic resin can be obtained without any influence of the configuration and size of the mounting portion 27. In addition, since the top end face of the extended portion 28 is formed slightly lower than the top end face of the mounting portion 27, it is possible to reduce both the material cost and weight of the sensor cap.

Furthermore, according to this modification, the width W2 of the extended portion 28 is formed so that it is smaller than the width W1 of the mounting portion 27. This also makes it possible to reduce both the material cost and weight of the sensor cap.

Figure 6:
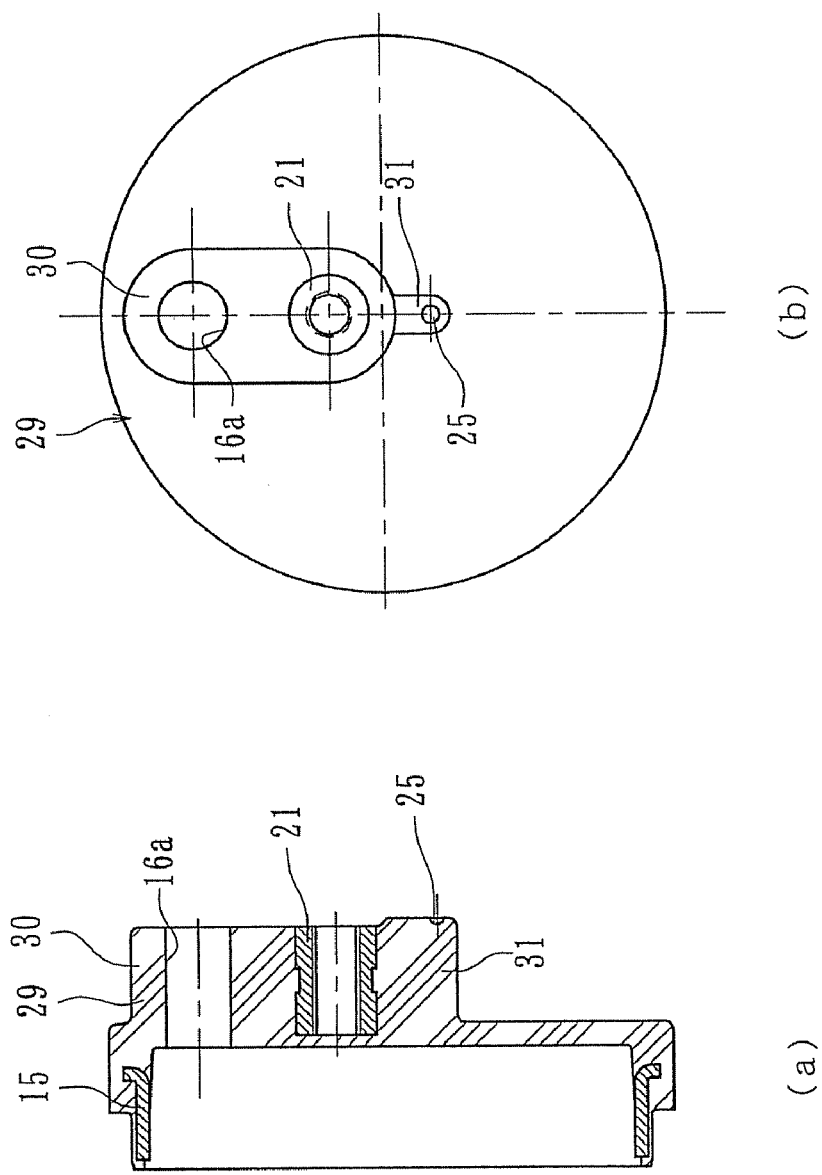
FIG. 6(a) is a longitudinal-section view of a further modification of a sensor cap of FIG. 3.
FIG. 6(b) is a side elevation view of FIG. 6(a).

Another modification of FIG. 3 is shown in FIG. 6. It basically differs from the previous embodiments only in the part of the configuration of mounting portion. Thus, the same reference numerals are used to designate the same or similar parts.

An axially projected mounting portion 30 is integrally formed with the cap body 29 at a radially outward portion. An extended portion 31 is formed continuously from the mounting portion 30. The top end face of the extended portion 31 is formed slightly higher than the top end face of the mounting portion 30. The gate 25 is set on the extended portion 31. Accordingly, this makes it possible to set the position of the gate 25 so that the pouring port integrally formed with the mold body is not interfered with by the mounting portion 30 of the cap body 29. Thus, a radial smooth flow and a substantially uniform flow velocity of the melted synthetic resin can be obtained without any influence of the configuration and size of the mounting portion 30. In addition, since the top end face of the extended portion 31 is formed slightly higher than the top end face of the mounting portion 30, it is possible to prevent the pouring port from being interfered with by various configurations of the sensor mounting potion.

Figure 7:
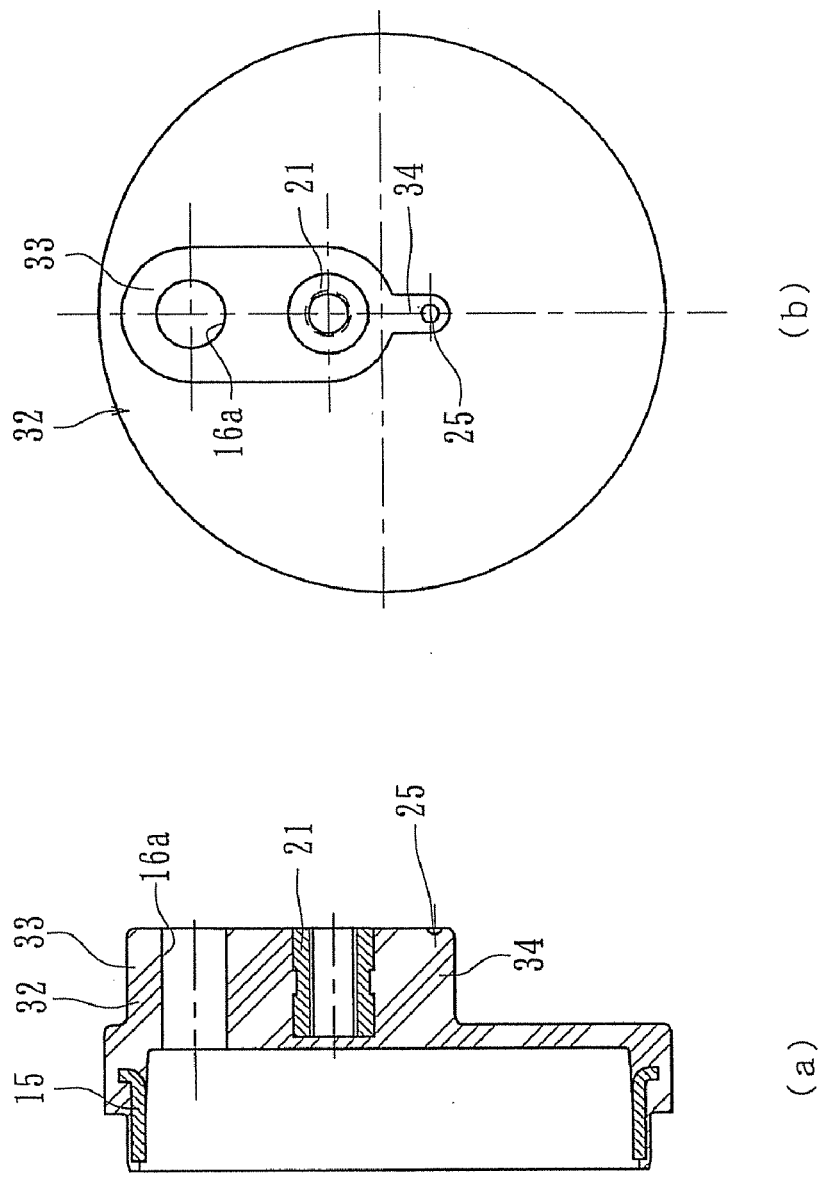
FIG. 7(a) is a longitudinal-section view of a further modification of a sensor cap of FIG. 3.
FIG. 7(b) is a side elevation view of FIG. 7(a).
Figure 8:
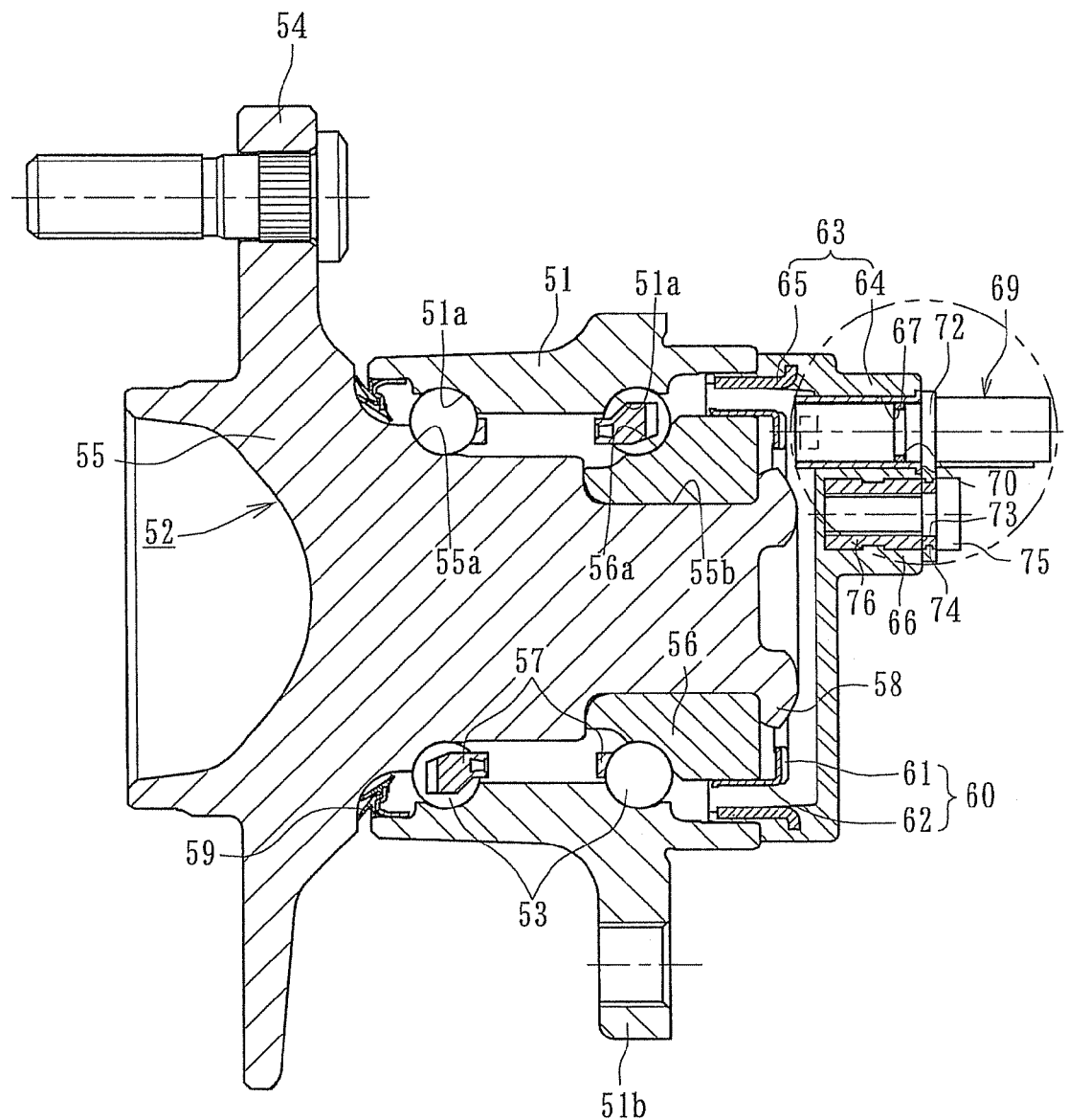
FIG. 8 is a longitudinal-section view of a prior art wheel bearing apparatus incorporating a rotational speed detecting apparatus.
Figure 9:
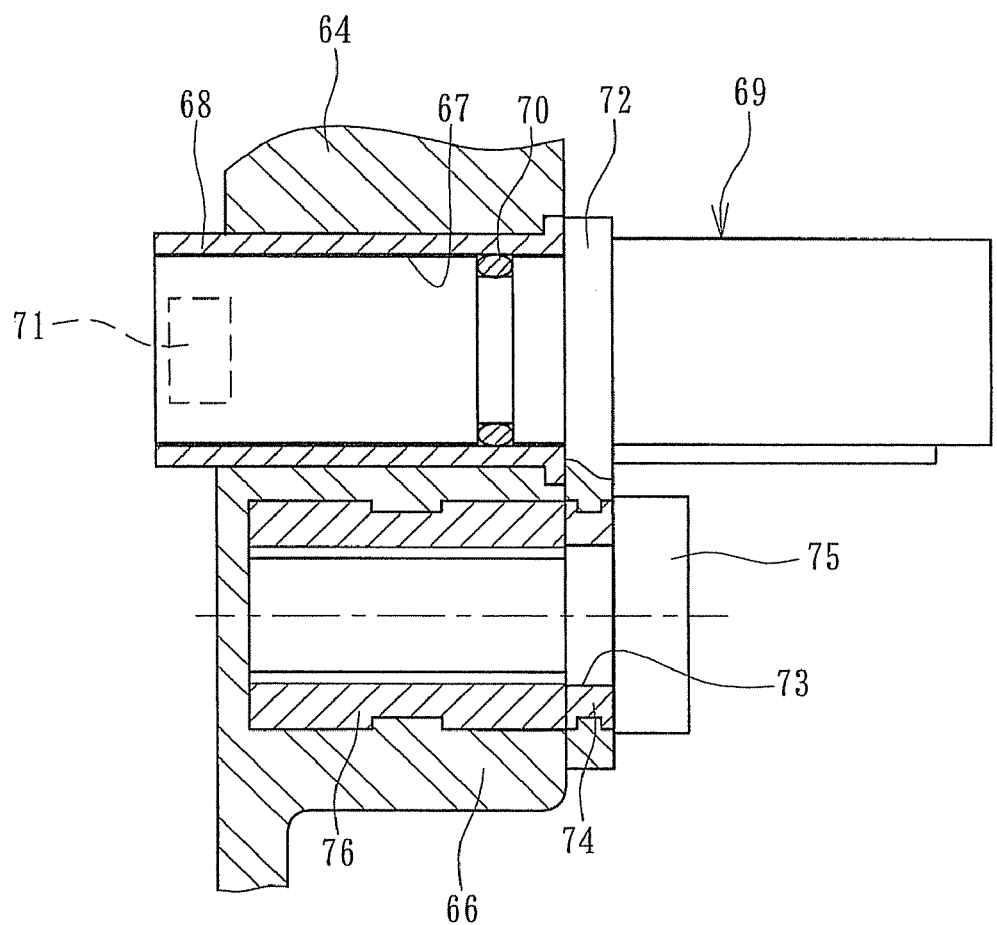
FIG. 9 is a partially enlarged view of FIG. 8.
Figure 10:
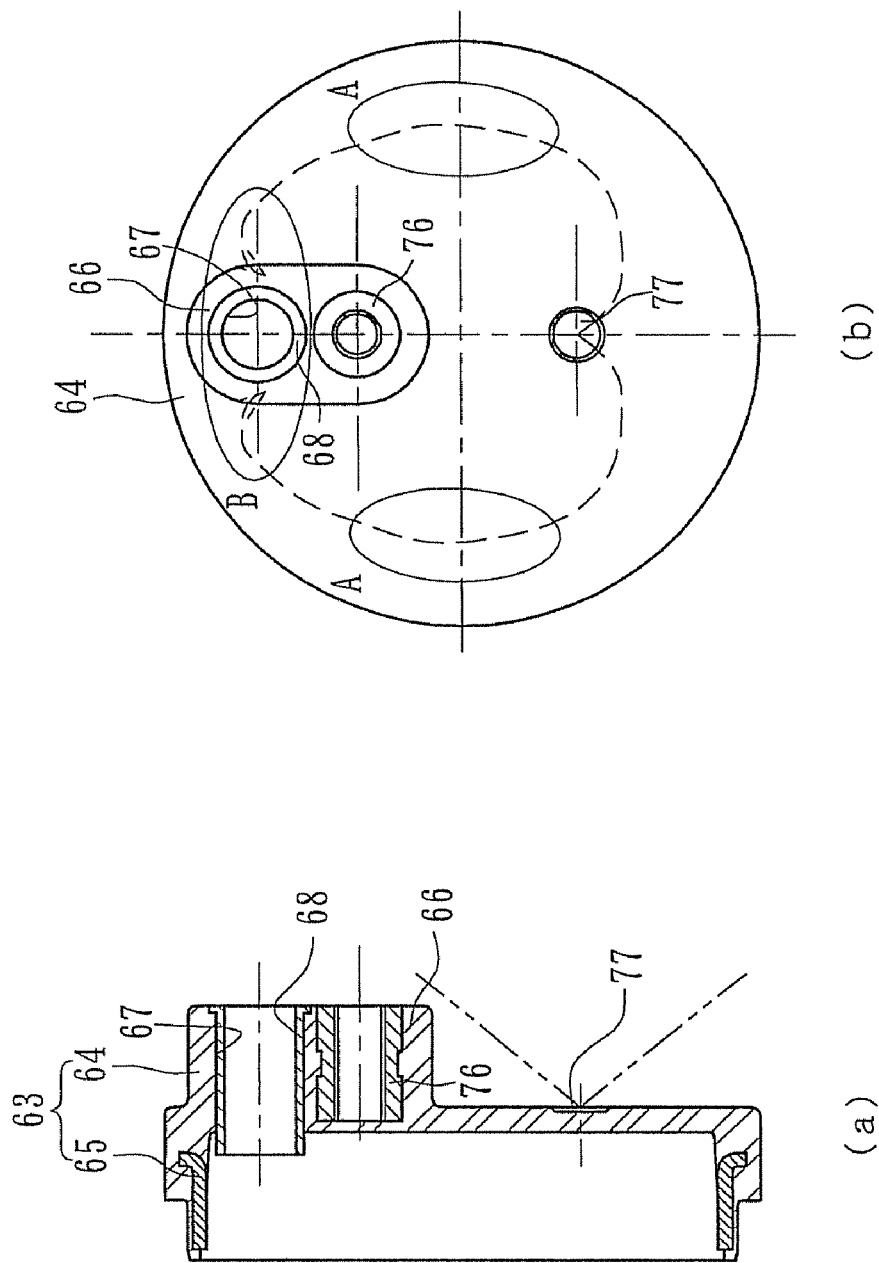
FIG. 10(a) is a longitudinal-section view of a sensor cap of FIG. 8.
FIG. 10(b) is a side elevation view of FIG. 10(a).

A further modification of FIG. 3 is shown in FIG. 7. It basically differs from the previous embodiments only in part of the configuration of the mounting portion. Thus, the same reference numerals are used to designate the same or similar parts.

An axially projected mounting portion 33 is integrally formed with the cap body 32 at a radially outward portion. An extended portion 34 is formed continuously from the mounting portion 33. The top end face of the extended portion 34 is formed at substantially the same height as the top end face of the mounting portion 33. The gate 25 is set on the extended portion 34. Accordingly, this makes it possible to set the position of the gate 25 so that the pouring port integrally formed with the mold body is not interfered with by the mounting portion 33 of the cap body 32. Thus a radial smooth flow and a substantially uniform flow velocity of the melted synthetic resin can be obtained without any influence of the configuration and size of the mounting portion 33. In addition, since the top end face of the extended portion 34 is formed at substantially the same height as that of the mounting portion 33, it is possible to easily make the manufacture of the mold.

The wheel bearing apparatus incorporating a rotational speed detecting apparatus of the present disclosure can be applied to a wheel bearing apparatus of a type where a cap body of synthetic resin is fit into an outer member.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A wheel bearing apparatus incorporating a rotational speed detecting apparatus comprising:
   an outer member integrally formed, on its inner circumference, with double row outer raceway surfaces;
   an inner member including a wheel hub and at least one inner ring, the wheel hub is integrally formed, on its one end, with a wheel mounting flange, a cylindrical portion axially extends from the wheel mounting flange, the inner ring is press fit onto the cylindrical portion of the wheel hub, the wheel hub and the inner ring are formed, on their outer circumferences, with double row inner raceway surfaces that oppose the double row outer raceway surfaces;
   double row rolling elements are contained between the inner and outer raceway surfaces of the inner and outer members;
   a pulser ring is adapted to fit onto the outer circumference of the inner ring and secures to it, the pulser ring has a magnetic characteristics alternately and equidistantly varying along its circumferential direction;
   a cylindrical sensor cap has a bottom formed by plastic injection molding, the sensor cap is adapted to be fit into and secures to the inner circumference of an inner-side end of the outer member;

a mounting portion axially projects from a radially outer portion of the sensor cap, an inserting bore is formed in the mounting portion so that it axially extends at a position corresponding to the pulser ring;

a sensor unit is mounted in the inserting bore, a rotational speed sensor is embedded in the sensor unit, the speed sensor opposes the pulser ring via a predetermined axial air gap; an extending portion having two substantially parallel side walls that extend from the mounting portion and a position of a gate of a mold is set on the extending portion of the sensor cap.

2. The wheel bearing apparatus incorporating the rotational speed detecting apparatus of claim 1, wherein a top end face of the extended portion is formed so that it is positioned slightly lower than that of the mounting portion.

3. The wheel bearing apparatus incorporating the rotational speed detecting apparatus of claim 2, wherein a width of the extended portion is formed so that it is smaller than a width of the mounting portion.

4. The wheel bearing apparatus incorporating the rotational speed detecting apparatus of claim 1, wherein a top end face of the extended portion is formed so that it is positioned slightly higher than that of the mounting portion.

5. The wheel bearing apparatus incorporating the rotational speed detecting apparatus of claim 4, wherein a width of the extended portion is formed so that it is smaller than a width of the mounting portion.

6. The wheel bearing apparatus incorporating the rotational speed detecting apparatus of claim 1, wherein a top end face of the extended portion is formed so that it is positioned at substantially the same height as that of the mounting portion.

7. The wheel bearing apparatus incorporating the rotational speed detecting apparatus of claim 6, wherein a width of the extended portion is formed so that it is smaller than a width of the mounting portion.

8. The wheel bearing apparatus incorporating the rotational speed detecting apparatus of claim 1, wherein the sensor unit further comprises a sensor holder integrally formed with an inserting portion where the rotational speed sensor is embedded, a mounting flange is mounted on the mounting portion of the sensor cap, a nut is embedded in the mounting portion by insert molding, and the sensor holder is detachably secured to the mounting portion by a securing bolt screwed into the nut.

9. The wheel bearing apparatus incorporating the rotational speed detecting apparatus of claim 1, wherein the sensor cap further comprises a cylindrical cap body with a bottom formed by plastic injection molding, a metal core is integrally molded into an opening of the cap body, and the metal core is exposed to the outer circumference of the cap body and press-fit into the inner circumference of the end of the outer member.

10. The wheel bearing apparatus incorporating the rotational speed detecting apparatus of claim 9, wherein the metal core is formed by press working of a non-magnetic steel sheet.

* * * * *